United States Patent
Zhang

(10) Patent No.: US 11,003,895 B2
(45) Date of Patent: May 11, 2021

(54) SYSTEMS AND METHODS FOR VERIFYING AUTHENTICITY OF ID PHOTO

(71) Applicant: BEIJING DIDI INFINITY TECHNOLOGY AND DEVELOPMENT CO., LTD., Beijing (CN)

(72) Inventor: Tianming Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 31 days.

(21) Appl. No.: 16/236,268

(22) Filed: Dec. 28, 2018

(65) Prior Publication Data

US 2019/0180086 A1    Jun. 13, 2019

Related U.S. Application Data

(63) Continuation of application No. PCT/CN2017/091300, filed on Jun. 30, 2017.

(51) Int. Cl.
*G06K 9/00* (2006.01)
*G06T 7/90* (2017.01)
(Continued)

(52) U.S. Cl.
CPC ....... *G06K 9/00288* (2013.01); *G06K 9/6262* (2013.01); *G06T 7/40* (2013.01);
(Continued)

(58) Field of Classification Search
CPC ............. G06K 9/00288; G06K 9/6262; G06K 9/4628; G06K 9/4647; G06T 7/90; G06T 7/40
(Continued)

(56) References Cited

U.S. PATENT DOCUMENTS 10,311,288 B1 * 6/2019 Dandekar ............... G06F 16/51
2007/0253604 A1 * 11/2007 Inoue .................. G06K 9/00221
382/118
(Continued)

FOREIGN PATENT DOCUMENTS

CN 103207898 A 7/2013
CN 104573647 A 4/2015
(Continued)

OTHER PUBLICATIONS

International Search Report in PCT/CN2017/091300 dated Mar. 30, 2018, 4 pages.
(Continued)

*Primary Examiner* — Van D Huynh
(74) *Attorney, Agent, or Firm* — Metis IP LLC

(57) ABSTRACT

A system and method for verifying authenticity of a target ID photo are provided. The method may include: receiving, by at least one computer, a target identification (ID) photo; accessing, by the at least one computer, a database of one or more reference ID photos; determining, by the at least one computer, a difference value between a predetermined area on the target ID photo and a predetermined area of one or more target reference ID photos in the database; upon determining that the difference value is less than a threshold value, generating, by the at least one computer, a warning code to indicate that the target ID photo is a fake ID photo.

14 Claims, 10 Drawing Sheets

(51) Int. Cl.
*G06T 7/40* (2017.01)
*G06K 9/62* (2006.01)
*G06K 9/46* (2006.01)

(52) U.S. Cl.
CPC ............ *G06T 7/90* (2017.01); *G06K 9/4628* (2013.01); *G06K 9/4647* (2013.01)

(58) Field of Classification Search
USPC ........................................................ 382/118
See application file for complete search history.

(56) References Cited

U.S. PATENT DOCUMENTS

| | | | |
|---|---|---|---|
| 2008/0069450 A1 | 3/2008 | Minami et al. | |
| 2009/0034805 A1* | 2/2009 | Perlmutter | G06F 16/5838 |
| | | | 382/118 |
| 2010/0158319 A1 | 6/2010 | Jung et al. | |
| 2012/0250984 A1* | 10/2012 | Taylor | G06K 9/00771 |
| | | | 382/162 |
| 2015/0341370 A1* | 11/2015 | Khan | H04L 63/0861 |
| | | | 726/30 |
| 2016/0132718 A1* | 5/2016 | Park | G06K 9/3275 |
| | | | 382/118 |
| 2016/0275341 A1* | 9/2016 | Li | G06K 9/4642 |
| 2016/0292494 A1* | 10/2016 | Ganong | G06Q 30/0277 |
| 2017/0193286 A1* | 7/2017 | Zhou | G06K 9/00281 |
| 2018/0108101 A1* | 4/2018 | Rodriguez | G06K 19/06028 |
| 2018/0204051 A1* | 7/2018 | Li | G06T 7/11 |

FOREIGN PATENT DOCUMENTS

| | | |
|---|---|---|
| CN | 104899280 A | 9/2015 |
| CN | 105912611 A | 8/2016 |
| CN | 105956572 A | 9/2016 |
| EP | 3086251 A1 | 10/2016 |
| GB | 1583090 A | 1/1981 |
| JP | 2000194806 A | 7/2000 |
| JP | 2015047759 A | 3/2015 |
| WO | 2017097057 A1 | 6/2017 |

OTHER PUBLICATIONS

Written Opinion in PCT/CN2017/091300 dated Mar. 30, 2018, 4 pages.
Azeddine Benlamoudi et al., Face Spoofing Detection Using Local Binary Patterns and Fishier Score, 2015 3rd International Conference on Control, Engineering & Information Technology (CEIT), 2015, 5 pages.
Jukka Komulainen et al., Context Based Face Anti-Spoofing, 2013 IEEE Sixth International Conference on Biometrics: Theory, Applications and Systems (BTAS), 2013, 8 pages.
Jianwei Yang et al., Face Liveness Detection with Component Dependent Descriptor, 2013 International Conference on Biometrics (ICB), 2013, 6 pages.
Jianwei Yang et al., Learn Convolutional Neural Network for Face Anti-Spoofing, Computer Science, 2014, 8 pages.
Extended Search Report in European Application No. 17914122.1 dated Jul. 23, 2019, 8 pages.
Antani, S. et al., Pattern Recognition Methods in Image and Video Databases: Past, Present and Future, Advances in Pattern Recognition, 1451: 31-53, 1998.
The Second Examination Report in Australia Application No. 2017421316 dated Aug. 20, 2020, 6 pages.
Notice of Allowance in Japanese Application No. 2018-568402 dated Sep. 1, 2020, 3 pages.
First Examination Report in Indian Application No. 201817049815 dated Feb. 1, 2021, 8 pages.

* cited by examiner

SYSTEMS AND METHODS FOR VERIFYING AUTHENTICITY OF ID PHOTO

CROSS-REFERENCE TO RELATED APPLICATIONS

This application is a Continuation of International Application No. PCT/CN2017/091300, filed on Jun. 30, 2017, the contents of which are incorporated herein by reference.

TECHNICAL FIELD

The present disclosure generally relates to technology field of photo authenticity verification, and in particular, systems and methods for identifying fake ID photo based on a similarity between a target ID photo and a reference ID photo.

BACKGROUND

When a user register with a service provided by a website, an identity verification may be required. A traditional way to perform the identity verification may require the user upload an identification (ID) photo. However, a user may make a fake ID photo to cheat, and the fake ID photo may be hard to identify. Therefore, it is desirable to provide systems and methods for verifying authenticity of Id photo uploaded by a user.

SUMMARY

According to an aspect of the present disclosure, a system may include at least one computer-readable storage medium including a set of instructions for verifying authenticity of a target ID photo, and at least one processor in communication with the computer-readable storage medium, wherein when executing the set of instructions, the at least one processor may be directed to: receive a target identification (ID) photo; access a database of one or more reference ID photos; determine a difference value between a predetermined area on the target ID photo and a predetermined area of one or more target reference ID photos in the database; upon determining that the difference value is less than a threshold value, generate a warning code to indicate that the target ID photo is a fake ID photo.

In some embodiments, the database of one or more reference ID photos includes one or more structured data, each of the one or more structured data encoding a reference feature vector associated with the predetermined area of a reference ID photos. In some embodiments, to determine the difference value, the at least one processor may be further directed to: determine a target feature vector based on one or more features of the predetermined area on the target ID photo; determine the difference value by comparing the target feature vector with a reference feature vector. In some embodiments, the difference value may be a Euclidean distance.

In some embodiments, the at least one processor may be further directed to: divide an ID photo into at least one block, the ID photo being a reference ID photo or the target ID photo; determine grey scale of one or more pixels in each block based on the second signal fragment; determine pixel gradient of each block based on the grey scale of the one or more pixels; determine texture feature of the ID photo based on the pixel gradient of each block; and store the texture feature of the at least one block to a feature vector in the storage medium, the feature vector being the reference feature vector or the target feature vector.

In some embodiments, the at least one processor may be further directed to: obtain grey scale of a predetermined area of pixels in the ID photo; determine one or more binary values based on the pixel and the one or more neighbors of the pixel, determine texture information of the pixel based on the one or more binary values; determine texture feature of the target ID photo based on the texture information of all the pixels of the target ID photo; and store the texture feature of the at least one block to a feature vector in the storage medium, the feature vector being the reference feature vector or the target feature vector.

In some embodiments, the at least one processor may be further directed to: determine face feature by a trained convolutional neural network, wherein the predetermined area of the target ID photo includes a portrait area.

In some embodiments, the at least one processor may be further directed to: determine fake ID feature by a trained convolutional neural network, wherein a trained convolutional neural network may be trained, by at least one computer, with a plurality of reference fake ID photos.

In some embodiments, the at least one processor may be further directed to establish the database of reference ID photos, including: to access in the memory via the data bus of the online platform to read data of the plurality of reference ID photos; to generate the reference feature vector for each of the plurality of reference ID photos based on a reference feature of each of the plurality of reference ID photos; to generate a cluster number based on the reference feature vector; for each of the plurality ID photos, to direct a read/write equipment to add the cluster number encoding the corresponding ID photo.

According to another aspect of the present disclosure, a method for approving a request may include: receiving a target identification (ID) photo; accessing, by the at least one computer, a database of one or more reference ID photos; determining, by the at least one computer, a difference value between a predetermined area on the target ID photo and a predetermined area of one or more target reference ID photos in the database; upon determining that the difference value is less than a threshold value, generating, by the at least one computer, a warning code to indicate that the target ID photo is a fake ID photo.

In some embodiments, the database of one or more reference ID photos may include one or more structured data, each of the one or more structured data encoding a reference feature vector associated with the predetermined area of a reference ID photos. In some embodiments, the determining of the difference value may include: determining a target feature vector based on one or more features of the predetermined area on the target ID photo; determining the difference value by comparing the target feature vector with a reference feature vector. In some embodiments, the difference value may be a Euclidean distance.

In some embodiments, the method may further include: dividing, by the at least one computer, an ID photo into at least one block, the ID photo being a reference ID photo or the target ID photo; determining, by the at least one computer, grey scale of one or more pixels in each block based on the second signal fragment; determining, by the at least one computer, pixel gradient of each block based on the grey scale of the one or more pixels; determining, by the at least one computer, texture feature of the ID photo based on the pixel gradient of each block; and storing, by the at least one computer, the texture feature of the at least one block to a feature vector in the storage medium, the feature vector being the reference feature vector or the target feature vector.

In some embodiments, the method may further include: obtaining, by the at least one computer, grey scale of a predetermined area of pixels in the ID photo; determining, by the at least one computer, one or more binary values between the pixel and the one or more neighbors of the pixel, determine, by the at least one computer, texture information of the pixel based on the one or more binary values; determine, by the at least one computer, texture feature of the target ID photo based on the texture information of all the pixels of the target ID photo; and storing, by the at least one computer, the texture feature of the at least one block to a feature vector in the storage medium, the feature vector being the reference feature vector or the target feature vector.

In some embodiments, the method may further include: determining, by the at least one computer, face feature by a trained convolutional neural network, wherein the predetermined area of the target ID photo may include a portrait area.

In some embodiments, the method may further include: determining, by the at least one computer, fake ID feature by a trained convolutional neural network, wherein a trained convolutional neural network may be trained, by the at least one computer, with a plurality of reference fake ID photos.

In some embodiments, the method may further include establishing the database of reference ID photos, which including: accessing, by the at least one computer, in the memory via the data bus of the online platform to read data of the plurality of reference ID photos; determining, by the at least one computer, a category for each of the plurality of ID photos; generating, by the at least one computer, the reference feature vector for each of the plurality of reference ID photos based on a reference feature of each of the plurality of reference ID photos; generating, by the at least one computer, a cluster number based on the reference feature vector; for each of the plurality ID photos, directing, by the at least one computer, a read/write equipment to add the cluster number encoding the corresponding category of the ID photo.

According to still another aspect of the present disclosure, a non-transitory computer readable medium, comprising at least one set of instructions for verifying authenticity of a target ID photo, when executed by at least one processor of a computer server, the at least one set of instructions may direct the at least one processor to perform acts of: receiving a target identification (ID) photo; accessing a database of one or more reference ID photos; determining a difference value between a predetermined area on the target ID photo and a predetermined area of one or more target reference ID photos in the database; upon determining that the difference value is less than a threshold value, generating a warning code to indicate that the target ID photo is a fake ID photo.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
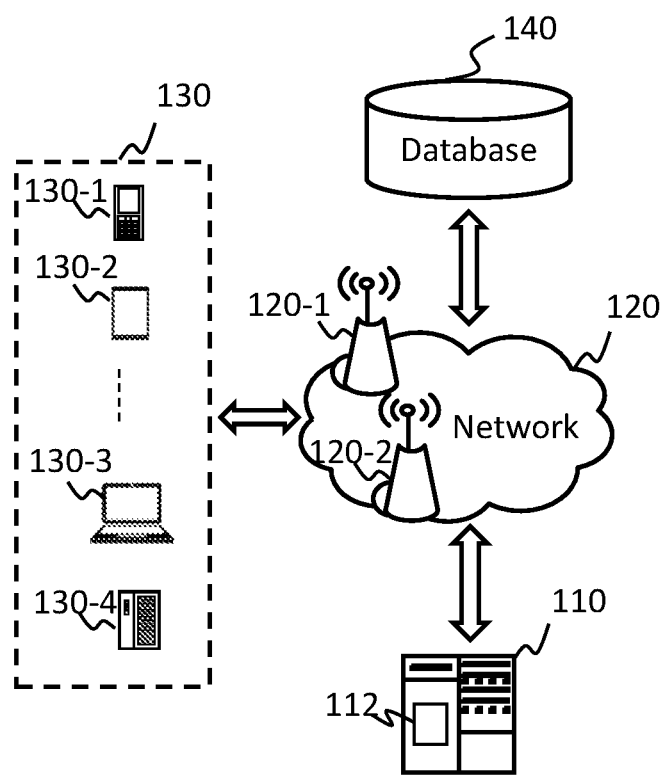
FIG. 1 is a block diagram of an exemplary system for fake ID identification according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods in the present disclosure are described primarily regarding verifying authenticity of a target ID photo, it should also be understood that this is only one exemplary embodiment. The system or method of the present disclosure may be applied to content-based image retrieval. For example, the system or method of the present disclosure may be applied to search similar images of a target image based on the content of the target image. The system or method of the present disclosure may also be applied to user of any kind of on-demand service platform when a user wants to register as a driver of an on-demand service platform. The application scenarios of the system or method of the present disclosure may include a webpage, a plug-in of a browser, a client terminal, a custom system, an internal analysis system, an artificial intelligence robot, or the like, or any combination thereof.

The term "ID photo" in the present disclosure may refer to a photo of identification (ID) that may be used to verify aspects of a person's identity. The ID photo may include a portrait area and a literal statement area. The portrait area may provide an image reminder of ID owner's appearance. The literal statement area provides a verbal description of ID owner's identity. The ID photo may further include a background area that reflect background of the ID in the ID photo. For example, since when a user takes a photo of an ID, the ID may be placed on a desk or a piece of paper and the background area may be the desk or the paper in the photo ID. The term "target ID photo" in the present disclosure may refer to an ID photo of which authenticity has not been verified by the system or method of the present disclosure, and user upload the "target ID photo" to a server or a database for a certain purpose, for example, for registering as a driver of an on-demand service platform. The term "reference ID photo" in the present disclosure may refer to an ID photo that has uploaded to the system of the present disclosure. Authenticity of the reference ID photo may have been verified, or may have not been verified. The term "fake ID photo" in the present disclosure may refer to an ID photo similar to one or more reference ID photos.

The term "feature vector" in the present disclosure may refer to an n-dimensional vector of numerical features that related to the features of the ID photo. The term "target feature vector" in the present disclosure may refer to the feature vector of the target ID photo. The term "reference feature vector" in the present disclosure may refer to the feature vector of the reference ID photo.

An aspect of the present disclosure relates to online systems and methods for verifying the authenticity of a target ID photo that a user uploads to the system in the present disclosure. According to the present disclosure, the systems and methods may verify the authenticity of a target ID photo by determining a similarity between the target ID photo and millions of reference ID photos with an online system in millisecond or even nanoseconds. If the target ID photo is similar to the reference ID photo, the target ID photo may be identified as a fake ID photo. The similarity between the target ID photo and the reference ID photo may be determined by comparing the target feature vector and the reference feature vector. Therefore, the present solution is deeply rooted in and aimed to solve a problem only occurred in post-Internet era.

FIG. 1 is a block diagram of an exemplary system 100 as an online platform for verifying authenticity of a target ID photo according to some embodiments. System 100 may include a server 110, a network 120, a terminal 130, and a database 140. The server 110 may include a processing engine 112.

The server 110 may be configured to process information and/or data relating to a service request, for example, a request for uploading an identification (ID) photo to the server 110 or the database 140. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the terminal 130 and/or the database 140 via the network 120. As another example, the server 110 may be directly connected to the terminal 130 and/or the database 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the request to perform one or more functions described in the present disclosure. For example, the processing engine 112 may obtain a request from the terminal 130 to upload a target ID photo to the server 110 or the database 140. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the terminal 130 may include a mobile device 130-1, a tablet computer 130-2, a laptop computer 130-3, and a built-in device 130-4 in a motor vehicle, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 130-4 may include an onboard computer, an onboard television, etc. Merely by way of example, the terminal 130 may include a controller (e.g., a remote-controller).

The network 120 may facilitate exchange of information and/or data. In some embodiments, one or more components in the system 100 (e.g., the server 110, the terminal 130, and the database 140) may send and/or receive information and/or data to/from other component(s) in the system 100 via the network 120. For example, the server 110 may obtain/acquire service request from the terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the system 100 may be connected to the network 120 to exchange data and/or information.

The database 140 may store data and/or instructions. In some embodiments, the database 140 may store data obtained/acquired from the terminal 130. In some embodiments, the database 140 may store data and/or instructions that the server 110 may execute or use to perform exemplary methods described in the present disclosure. In some embodiments, the database 140 may store reference ID photos, feature vectors corresponding to the reference ID photos, and cluster number corresponding to the feature vector. In some embodiments, the database 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 140 may be connected to the network 120 to communicate with one or more components in the system 100 (e.g., the server 110, the terminal 130). One or more components in the system 100 may access the data or instructions stored in the database 140 via the network 120. In some embodiments, the database 140 may be directly connected to or communicate with one or more components in the system 100 (e.g., the server 110, the terminal 130, etc.). In some embodiments, the database 140 may be part of the server 110.

Figure 2:
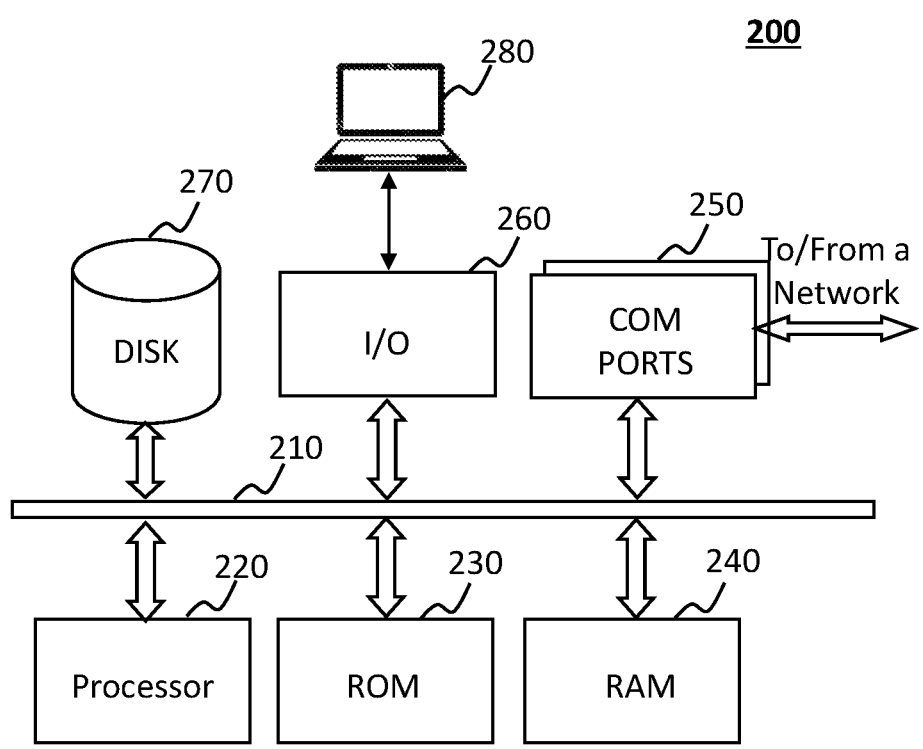
FIG. 2 is a schematic diagram illustrating exemplary hardware and software components of a computing device according to some embodiments.

FIG. 2 is a schematic diagram illustrating exemplary hardware and software components of a computing device 200 on which the server 110, the terminal 130, and/or database 140 may be implemented according to some embodiments of the present disclosure. For example, the processing engine 112 may be implemented on the computing device 200 and configured to perform functions of the processing engine 112 disclosed in the present disclosure.

The computing device 200 may be used to implement ID photo authenticity verification system for the present disclosure. The computing device 200 may implement any component of the fake ID photo identification service as described herein. In FIGS. 1-2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processor 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O port 260, supporting input/output between the computer and other components therein such as a user interface element 280. The computing device 200 may also receive programming and data via network communications.

Merely for illustration, only one processor 220 is described in the computing device 200. However, it should be note that the computing device 200 in the present disclosure may also include multiple processors, thus operations and/or method steps that are performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

One of ordinary skill in the art would understand that when an element of the system 100 performs, the element may perform through electrical signals and/or electromagnetic signals. For example, when a terminal 130 sends out a service request (e.g., request to upload an ID photo to the server 110 or the database 140) to the server 110, a processor of the terminal 130 may generate an electrical signal encoding the request. The processor of the terminal 130 may then send the electrical signal to an output port. If the terminal 130 communicates with the server 110 via a wired network, the output port may be physically connected to a cable, which further transmit the electrical signal to an input port of the server 110. If the terminal 130 communicates with the server 110 via a wireless network, the output port of the service requestor terminal 130 may be one or more antennas, which convert the electrical signal to electromagnetic signal. Similarly, the terminal 130 may receive an instruction and/or service request from the server 110 via electrical signal or electromagnet signals. Within an electronic device, such as the terminal 130 and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 3:
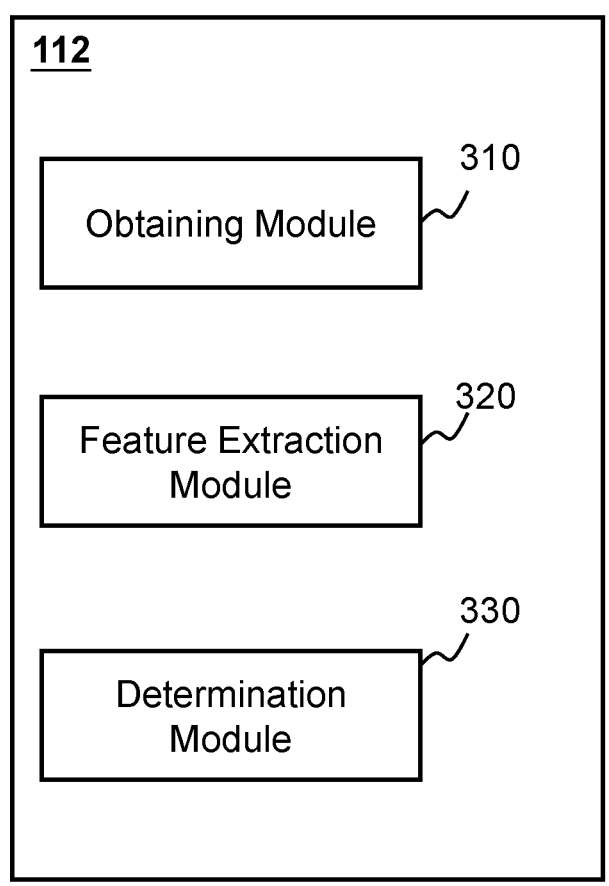
FIG. 3 is a block diagram illustrating an exemplary processing engine according to some embodiments.

FIG. 3 is a block diagram illustrating an exemplary processing engine 112 according to some embodiments. The processing engine 112 may include an obtaining module 310, a feature extraction module 320, and a determination module 330. The modules may be hardware circuits of all or part of the processing engine 112. The modules may also be implemented as an application or set of instructions read and executed by the processing engine. Further, the modules may be any combination of the hardware circuits and the application/instructions. For example, the modules may be the part of the processing engine 112 when the processing engine is executing the application/set of instructions.

The obtaining module 310 may obtain a request electrical signal via an I/O port. In some embodiments, the request electrical signal may represent and/or encode a request for uploading a target ID photo to the sever 110 or the database 140. In some embodiments, the request electrical signal may include a request signal fragment encoded the request for uploading the target ID photo to a target location. The request electrical signal may also include request signal fragment encoded target image data associated with the target ID photo.

The feature extraction module 320 may be configured to generate feature vectors based on one or more features of the ID photo. The feature of the ID photo may include color distribution feature, texture feature, face feature, or other fake ID feature, or any combination thereof.

In some embodiments, the feature extraction module 320 may be configured to extract the color distribution feature via a color histogram of the ID photo. The color histogram may represent number of pixels that have colors in each of a fixed list of color range that span the ID photo's color space. The color space may represent set of all possible colors in the ID photo.

In some embodiments, the feature extraction module 320 may be configured to extract the texture feature via a histogram of oriented gradients (HOG) of the ID photo, and/or via the local binary pattern (LBP) of the ID photo. The histogram of oriented gradients may count occurrences of gradient orientation in localized portions of the ID photo. The local binary pattern (LBP) may label pixels of the ID photo by thresholding neighborhood of each pixel and present the result as a binary number.

In some embodiments, the feature extraction module 320 may be configured to extract the face feature via a trained convolutional neural network (CNN). After trained by a plurality of human faces, the convolutional neural network may extract face feature from the ID photo.

In some embodiments, the feature extraction module 320 may be configured to extract the fake ID feature via a trained convolutional neural network (CNN). After trained by a plurality of fake ID photos, the convolutional neural network may extract fake ID feature from the ID photo.

The determination module 330 may be configured to generate a difference value between the target ID photo and the reference ID photo. In some embodiments, the difference value may be a Euclidean distance between the target feature vector and the reference feature vector.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the feature extraction module 320 may be integrated in the determination module 330 as a single module that may both generate feature vectors based on one or more feature of the ID photo and generate a difference value between the target ID photo and the reference ID photo. As still another example, the feature extraction module 320 may be divided into four units of color distribution feature extraction unit, texture feature extraction unit, face feature extraction unit and fake ID feature extraction unit to implement the functions of the feature extraction module 320, respectively.

Figure 4:
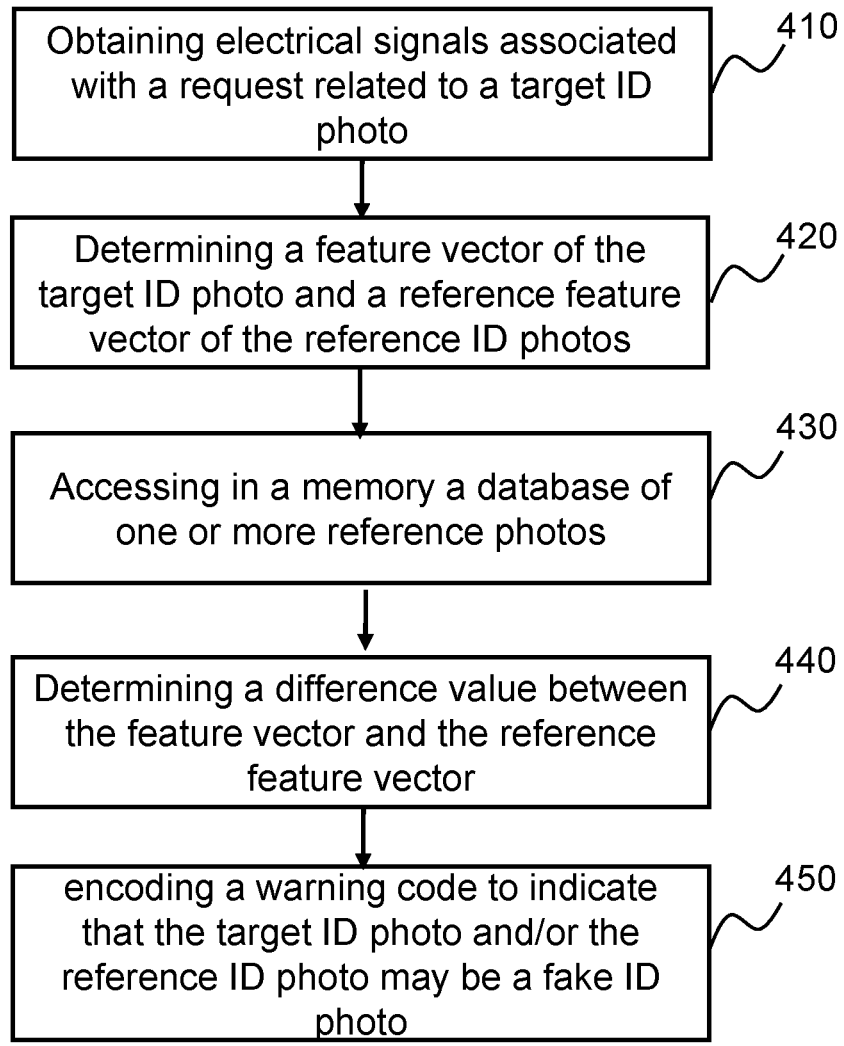
FIG. 4 is a flowchart of an exemplary process and/or method for verifying the authenticity of a target ID photo according to some embodiments of the present disclosure

FIG. 4 is a flowchart of an exemplary process and/or method 400 for verifying the authenticity of a target ID photo according to some embodiments of the present disclosure. In some embodiments, the process 400 may be implemented in the system 100 illustrated in FIG. 1. For example, the process 400 may be stored in the database 140 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110)

In step 410, the processor 220 may obtain a request electrical signal via the I/O port 260.

In some embodiments, the request electrical signal may represent and/or encode a request for uploading a target ID photo to the sever 110 or the database 140. In some embodiments, the request electrical signal may include a request signal fragment encoding the request for uploading the target ID photo to a target location (e.g., server 110, or database 140). The request electrical signal may also include a request signal fragment encoding target image data associated with the target ID photo.

In step 420, the processor 220 may determine a feature vector based on a predetermined area of the target ID photo as the target feature vector.

In some embodiments, processor 220 may determine the target feature vector according to one or more features of a predetermined area of the target ID photo. In some embodiments, a predetermined area of the target ID photo may represent whole area of the ID photo. In some embodiments, the predetermined area of the ID photo may represent an area of the ID photo excluding the portrait area, or including the portrait area. In some embodiments, the predetermined area of the ID photo may represent an area of the ID photo excluding the literal statement area, or including the literal statement area. The feature of the ID photo may include color distribution feature, texture feature, face feature and fake ID feature. In some embodiments, the processor 220 may determine a feature vector of the predetermined area of the reference ID photo as the reference feature vector. In some embodiments, the reference feature vector may be extracted and stored in the database 140 in advance. More description of feature extraction method may be found in FIGS. 5-11 and the description thereof.

In step 430, the processor 220 may access the database 140 via the data bus 210. With step 520, the processor 220 may retrieve one or more reference ID photos from the database 140.

Since millions or billions of reference ID photos may be stored in the database 140, to verify the authenticity of the target ID photo, it would take a very long time to compare the target ID photo with all the reference ID photos in the database 140. In some embodiments, the processor 220 may perform a locality sensitive hashing (LSH) algorithm to generate a cluster number for the reference feature vector. If reference feature vectors of different reference ID photos are similar to each other, the cluster number for these feature vectors may be the same. The processor 220 may cluster the reference ID photos in the database 140 into a plurality of clusters based on the cluster number. The processor 220 may generate a cluster number based on the target feature vector, and retrieve corresponding cluster in the database 140 to obtain the reference photos with the same cluster number.

In step 440, the processor 220 may generate a difference value between the target ID photo and the reference ID photo obtained in step 430.

In some embodiments, the difference value between the target ID photo and the reference ID photo may be a Euclidean distance between the target feature vector and the reference feature vector. For example, if a n-dimensional feature vector A is denoted as $(x_{11}, x_{12}, \ldots, x_{1n})$ and a n-dimensional feature vector B is denoted as $(x_{21}, x_{22}, \ldots, x_{2n})$, the Euclidean distance $d_{12}$ between the feature vector A and feature vector B may be determined by the following equation:

$$d_{12} = \sqrt{\Sigma_{k=1}^{n}(x_{1k}-x_{2k})^2}. \quad (1)$$

The lesser the Euclidean distance $d_{12}$, the higher a similarity between the target ID photo and the reference ID photo.

In step 450, upon determining that the first difference value is less than a threshold value (e.g., 0.1), the processor 220 may generate an electronic signal encoding a warning code to indicate that the target ID photo and/or the reference ID photo may be a fake ID photo.

When the processor 220 determines that the target ID photo is sufficiently like the reference ID photo, it would be reasonable to conclude that the target ID photo should represent the same person as the reference ID photo, which has already been in a database of the system 100. However, since someone is trying to register with the system 100 using the target ID photo as a different person, at least one of the reference ID photo and the target ID photo is fake. Without sufficient evidence about (or without determining) which ID photo is the fake one, the processor 220 may generate the warning code to indicate that the target ID photo and/or the reference ID photo may be a fake ID photo, It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 400. As another example, all the steps in the exemplary process/method 400 may be implemented in a computer-readable medium including a set of instructions. The instructions may be transmitted in a form of electronic current.

Figure 5:
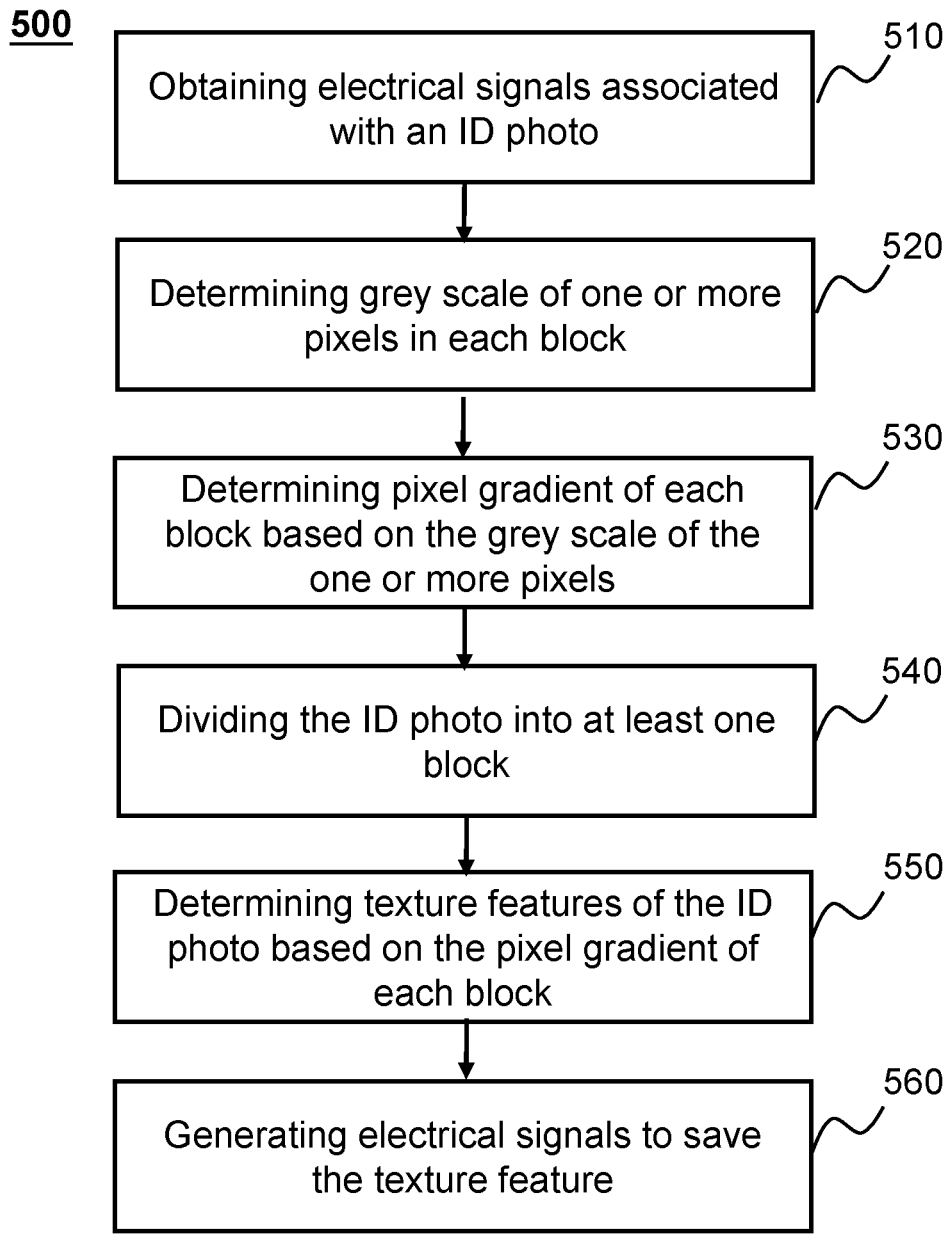
FIG. 5 is a flowchart of an exemplary process and/or method for extracting texture feature of an ID photo via a histogram of oriented gradients according to some embodiments of the present disclosure.

FIG. 5 is a flowchart of an exemplary process and/or method 500 for extracting texture feature of an ID photo via a histogram of oriented gradients according to some embodiments of the present disclosure. In some embodiments, the process 500 may be implemented in the system 100 illustrated in FIG. 1. For example, the process 500 may be stored in the database 140 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 510, the processor 220 may obtain a request electrical signal via the I/O port 260. In some embodiments, the request electrical signal may represent and/or encode a request for extracting the texture feature from an ID photo via a histogram of oriented gradients. In some embodiments, the request electrical signal may include a request signal fragment encoded the request for extracting the texture feature via the histogram of oriented gradients. The request electrical signal may also include a request signal fragment encoded image data associated with the ID photo.

In step 520, the processor 220 may obtain grey scale of a predetermined area of pixels in the ID photo. In some embodiments, a predetermined area of the target ID photo may represent whole area of the ID photo. In some embodiments, the predetermined area of the ID photo may represent an area of the ID photo excluding the portrait area, or including the portrait area. In some embodiments, the predetermined area of the ID photo may represent an area of the ID photo excluding the literal statement area, or including the literal statement area.

In some embodiments, the processor 220 may obtain grey scale of pixels with an area excluding at least one portrait of the ID photo. In some embodiments, the processor 220 may perform certain algorithm to generate the grey scale, including floating-point arithmetic, integer algorithm, transfer algorithm, mean value algorithm, or the like, or any combinations thereof.

In step 530, the processor 220 may generate gradient of each pixel based on the grey scale generated in step 520.

The gradient at each pixel of the ID photo may be a vector in a 2-dimension space (a "2D vector") with component in horizontal and vertical directions. At each pixel of the ID photo, gradient direction, which may be direction of the 2D vector, may represent a direction of largest possible grey scale increase at the pixel; gradient value, which may be length of the 2D vector, may represent to the rate of change in that direction of largest possible grey scale increase at the pixel.

In some embodiments, the processor 220 may filter grey scale data of each pixel with a filter kernel [−1, 0, 1], and a filter kernel $[-1, 0, 1]^T$, wherein, $$G_h(x,y)=f(x+1,y)-f(x-1,y), \quad (2)$$

$$G_v(x,y)=f(x,y+1)-f(x,y-1). \quad (3)$$

In Equations (2) and (3), f(x, y) may denote the grey scale of a pixel with coordinate of (x, y) in the ID photo. $G_h$(x, y) may denote horizontal gradient value of the pixel with coordinate of (x, y) in the ID photo, and $G_v$(x, y) may denote vertical gradient value of the pixel with coordinate of (x, y) in the ID photo. The processor 220 may generate gradient value and gradient direction of the pixel based on the horizontal gradient value and the vertical gradient value, wherein.

$$G(x, y) = \sqrt{G_h(x, y)^2 + G_v(x, y)^2}, \quad (4)$$

$$\alpha(x, y) = \tan^{-1}\left(\frac{G_v(x, y)}{G_h(x, y)}\right). \quad (5)$$

In Equations (4) and (5), G(x, y) may denote the gradient value of the pixel with coordinate of (x, y) in the ID photo, and α(x, y) may denote the gradient direction of the pixel with coordinate of (x, y) in the ID photo. In some embodiments, the gradient direction may be 0-180 degree or 0-360 degree.

In step 540, the processor 220 may divide the predetermined area of the ID photo into one or more blocks.

The processor 220 may further divide the block into one or more cell. For example, the processor 220 may divide the ID photo into four blocks, and each block may include 3×3 cells, and each cell may include 6×6 pixels.

In some embodiments, processor 220 may generate a histogram of oriented gradients (HOG) to represent gradient direction distribution of the predetermined area of the ID photo. In some embodiments, the HOG may have nine bins. Each bin of the HOG may represent a certain direction range. In some embodiments, the direction range of the bins may be 0-20 degree, 20-40 degree, 40-60 degree, 60-80 degree, 80-100 degree, 100-120 degree, 120-140 degree, 140-160 degree, and 160-180 degree.

The processor 220 may conduct a voting, for all the pixels in a cell, based on the gradient direction and the direction range of the bins. Value of the bin may relate to number of pixels in the bin and gradient value of these pixels in the bin. For example, if the gradient direction of pixel A in a cell is 17.1 degree, the processor 220 may add the gradient value of the pixel A into value of the 0-20 degree bin. Thus, the processor 220 may generate a HOG of a cell. In some embodiments, the processor 220 may group the HOGs of the cells to generate a pixel gradient of a block.

In step 550, the processor 220 may determine the texture feature of the ID photo based on the pixel gradient of each block. In some embodiments, the processor 220 may respectively normalize each block to obtain a texture feature vector.

In step 560, the processor 220 may generate an electrical signal to save and/or incorporate the texture feature into the target feature vector or the reference feature vector. The texture feature may be stored in a storage medium or any other devices with storing function. For example, the texture feature may be saved as structured data with one or more pointers pointing to the structured data of the target feature vector or the reference feature vector. Alternatively, the texture feature may be incorporated in the structured data of the target feature.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 500. As another example, all the steps in the exemplary process/method 500 may be implemented in a computer-readable medium including a set of instructions. The instructions may be transmitted in the form of electronic current.

Figure 6:
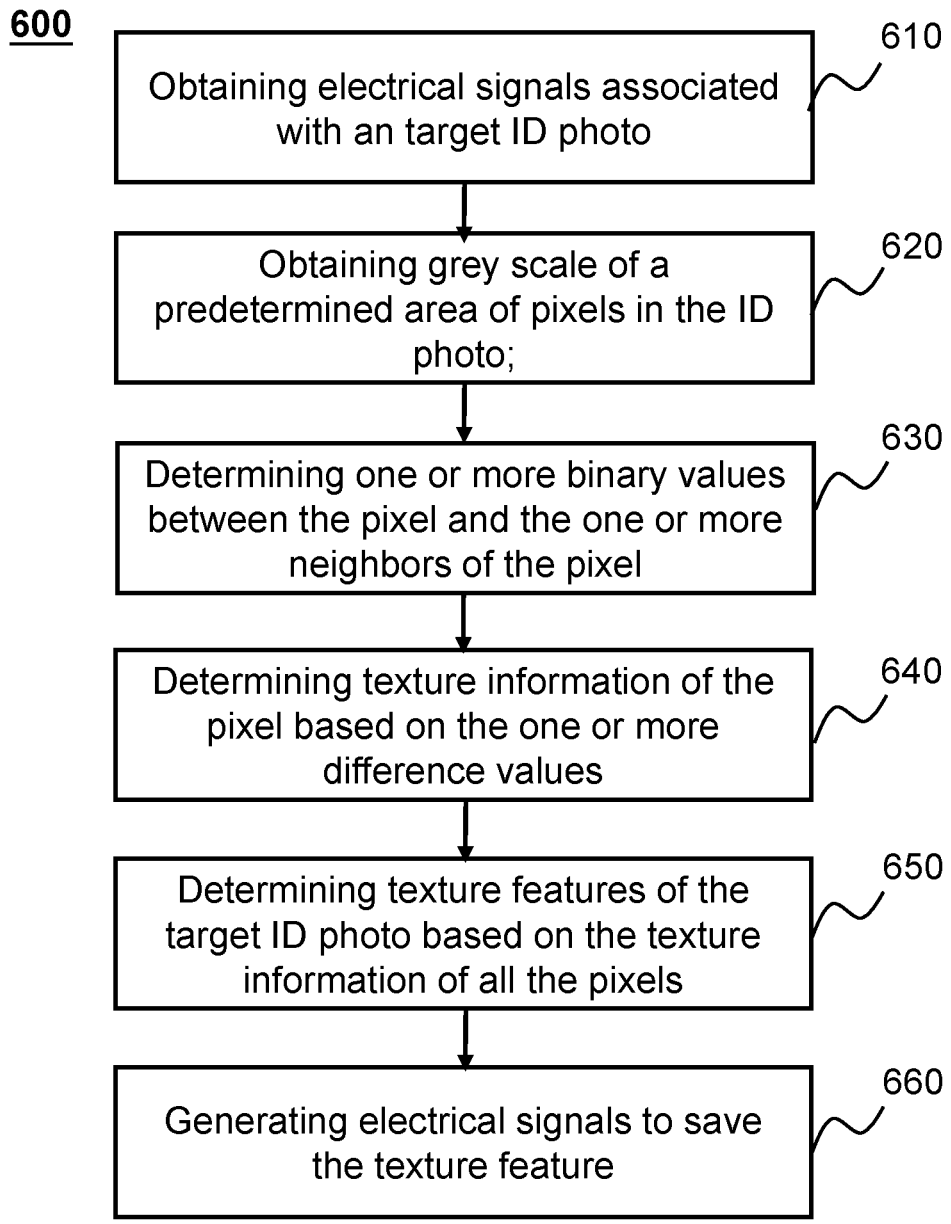
FIG. 6 is a flowchart of an exemplary process and/or method for extracting texture feature of an ID photo via a local binary pattern according to some embodiments of the present disclosure.

FIG. 6 is a flowchart of an exemplary process and/or method 600 for extracting texture feature of an ID photo via a local binary pattern according to some embodiments of the present disclosure. In some embodiments, the process 600 may be implemented in the system 100 illustrated in FIG. 1. For example, the process 600 may be stored in the database 140 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 610, the processor 220 may obtain a request electrical signal via the I/O port 260. In some embodiments, the request electrical signal may represent and/or encode a request for extracting the texture feature from an ID photo via a local binary pattern. In some embodiments, the request electrical signal may include a request signal fragment encoded the request for extracting the texture feature via the local binary pattern. The request electrical signal may also include a request signal fragment encoded image data associated with the ID photo.

In step 620, the processor 220 may obtain grey scale of a predetermined area of pixels in the ID photo. In some embodiments, the processor 220 may obtain grey scale of pixels with an area excluding portrait area of the ID photo. In some embodiments, the processor 220 may perform certain algorithm to generate the grey scale, including floating-point arithmetic, integer algorithm, transfer algorithm, mean value algorithm, or the like, or any combination thereof.

In step 630, for each pixel in the ID photo, the processor 220 may compare the pixel (may be considered as a center pixel) to each of its eight neighbors (on the center pixel's left-top, left-middle, left bottom, right-top, right middle, right bottom, top, and bottom) by a certain sequence (e.g., clockwise or counter-clockwise.) In some embodiments, the processor 220 may determine the grey scale of the center pixel as a threshold. The processor 220 may mark the binary value for one of the neighbors of the center pixel based on the comparison of the grey scale. For example, if the grey scale of one of the neighbors of the center pixel is greater than or equal to the threshold (e.g., the grey scale of the center pixel), the neighbor may be marked as "1", and if the grey scale of one of the neighbors is less than the threshold, the neighbor may be marked as "0". Thus, the processor 220 may obtain a binary string (e.g., "00101010") by arranging the binary value of the neighbors of the center pixel.

In step 640, the processor 220 may generate texture information based on the binary string of each pixel. In some embodiments, the processor 220 may transform the binary string into a local binary pattern (LBP) value (e.g., a decimal value) and replace greyscale of the center pixel with the LBP value.

In step 650, the processor 220 may determine texture feature of the ID photo based on the texture information. In some embodiments, after step 620 to step 640, each pixel of the ID photo may have a LBP value. In some embodiments, the processor 220 may divide the ID photo into one or more regions. Each region has one or more pixels. The processor 220 may generate a LBP histogram based on the LBP value of each region to represent feature of the region. The processor 220 may generate a texture feature based on the LBP histogram. In some embodiments, the processor 220 may generate a feature vector based on the texture feature.

In step 660, the processor 220 may generate an electrical signal to save the texture feature into the target feature vector or the reference feature vector. The texture feature may be stored in a storage medium or any other devices with storing function.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 600. As another example, all the steps in the exemplary process/method 600 may be implemented in a computer-readable medium including a set of instructions. The instructions may be transmitted in the form of electronic current.

Figure 7:
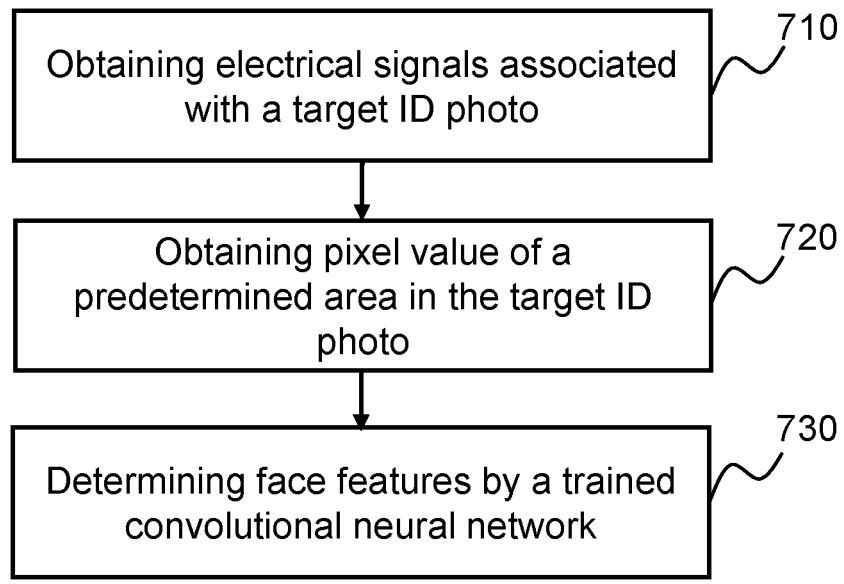
FIG. 7 is a flowchart of an exemplary process for obtaining face feature of a target ID photo according to some embodiments of the present disclosure.

FIG. 7 is a flowchart of an exemplary process for obtaining face feature of a target ID photo according to some embodiments of the present disclosure. In some embodiments, the process 600 may be implemented in the system 100 illustrated in FIG. 1. For example, the process 700 may be stored in the database 150 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 710, the processor 220 may obtain a request electrical signal via the I/O port 260. In some embodiments, the request electrical signal may represent and/or encode a request for extracting the face feature from an ID photo via a trained convolutional neural network (CNN). In some embodiments, the request electrical signal may include a request signal fragment encoded the request for extracting the face feature via the CNN. The request electrical signal may also include a request signal fragment encoded image data associated with the ID photo.

In step 720, the processor 220 may obtain pixel value of pixels of a predetermined area in the ID photo. In some embodiments, the processor 220 may obtain pixel value of pixels within a portrait area of the ID photo. For instance, a pixel value may refer to the luminance value of a pixel, the grey value of a pixel, the color or RGB value of a pixel, the saturation value of a pixel, or the like, or any combination thereof.

In step 730, the processor 220 may perform a trained convolutional neural network (CNN) to extract face feature. In some embodiments, the processor 220 may train the CNN with plurality of reference ID photos of which the face feature may be predetermined.

In some embodiments, the CNN may include one or more input layers, one or more convolution layers, one or more pooling layers, one or more fully-connected layers and one or more output layer.

In some embodiments, the input layer may specify a fixed size for the input images, thus the ID photo with only the portrait area, may be resized accordingly before provided to the input layer. The convolution layers may then convolve the ID photo with multiple kernels using trainable weights. In some embodiments, the kernel may activate a face feature when the face feature at some spatial position in the ID photo. The kernel may activate different face features with different trainable weights. The pooling layer may reduce the size of the ID photo after convoluted by the convolution layer, while trying to extract the face feature activated by the kernel. In some embodiments, the convolution layer and the pooling layer may compose the feature extraction part of the CNN. Then, the fully-connected layer may weight and combine the extracted face features to generate a face feature, then the output layer may output the face feature.

In some embodiments, to train the CNN, the processor 220 may feed the CNN with plurality of reference ID photos of which the actual face feature may be predetermined. Then the processor 220 may generate an error function based on the difference between the face feature generated by the output layer and the predetermined actual feature of the reference ID photos in the database 140. The processor 220 may return the error function to the convolution layers and change the trainable weight of the kernel, until the error function reaches a minimum value. Thus, the processor 220 may train the CNN to extract face feature from the ID photo.

After determining the face feature by a trained CNN, the processor 220 may generate an electrical signal to save the face feature into the target feature vector or the reference feature vector. The face feature may be stored in a storage medium or any other devices with storing function.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 700. As another example, all the steps may be implemented in a computer-readable medium including a set of instructions. The instructions may be transmitted in the form of electronic current.

Figure 8:
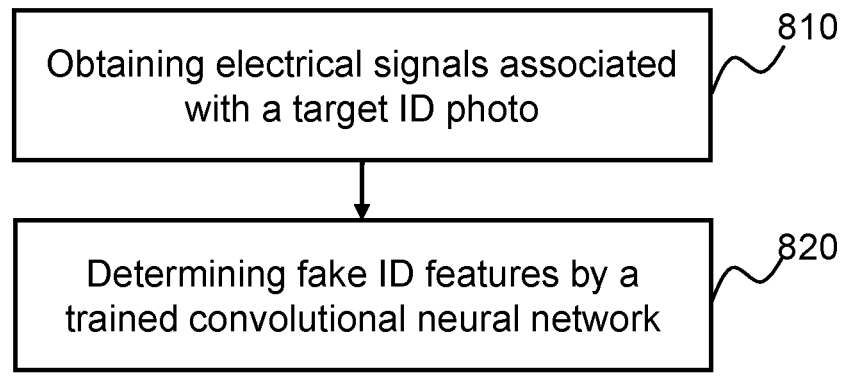
FIG. 8 is a flowchart of an exemplary process and/or method for extracting fake ID feature of an ID photo according to some embodiments of the present disclosure.

FIG. 8 is a flowchart of an exemplary process and/or method 800 for extracting fake ID feature of an ID photo according to some embodiments of the present disclosure. In some embodiments, the process 800 may be implemented in the system 100 illustrated in FIG. 1. For example, process 600 may be stored in the database 150 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 810, the processor 220 may obtain a request electrical signal via the I/O port 260. In some embodiments, the request electrical signal may represent and/or encode a request for extracting the fake ID feature from an ID photo via a trained convolutional neural network (CNN). In some embodiments, the request electrical signal may include a request signal fragment encoded the request for extracting the fake ID feature via the CNN. The request electrical signal may also include a request signal fragment encoded image data associated with the ID photo.

In step 820, the processor 220 may extract fake ID feature of the ID photo may be determined by a trained convolutional neural network. The processor 220 may train the CNN with a plurality of reference ID photo. In some embodiments, the reference ID photo used to train the CNN may be fake ID photo. The fake ID feature that the processor may extract from the fake ID photo may include fake color feature, fake texture feature, fake face feature, or the like, or any combination thereof. In some embodiments, the CNN used in the step 820 may be similar to the CNN used in the step 730. More detailed description of training CNN with a plurality of fake ID photos are provided elsewhere in this disclosure (e.g., FIG. 7).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 800. As another example, all the steps may be implemented in a computer-readable medium including a set of instructions. The instructions may be transmitted in the form of electronic current.

Figure 9:
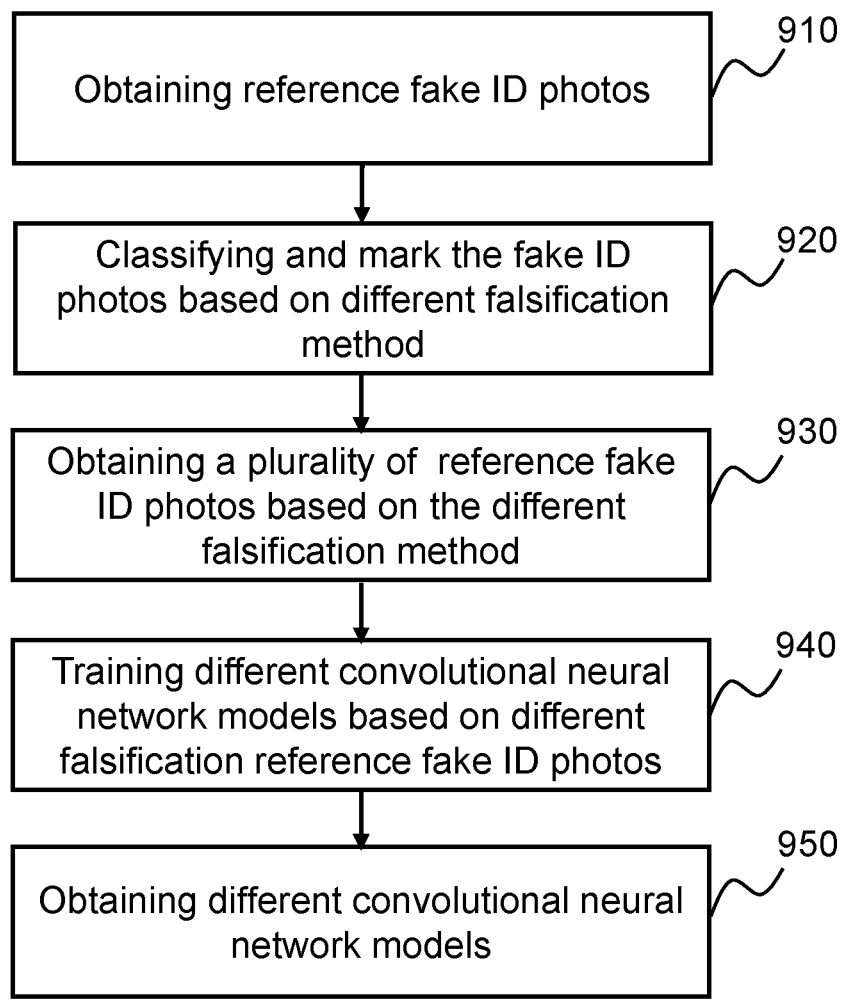
FIG. 9 is a flowchart of an exemplary process and/or method for training CNN according to some embodiments of the present disclosure.

FIG. 9 is a flowchart of an exemplary process and/or method 900 for training CNN according to some embodiments of the present disclosure. Training CNN may be used to determine fake feature of an ID photo. In some embodiments, the process 900 may be implemented in the system 100 illustrated in FIG. 1. For example, the process 900 may be stored in the database 140 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 910, a plurality of reference ID photos may be obtained from memory, database or Internet by one or more computers. In some embodiments, the reference ID photos may be fake reference ID photo. One reference fake ID photo may be the photo that have been modified based on a real ID photo. It should be noted that one or more reference fake ID photo may be obtained by modifying one real ID photo and a reference fake ID photo may be combined by extracting different parts of one or more real ID photo.

In step 920, the processor 220 may classify and mark the reference fake ID photos based on different falsification methods. The falsification method may represent how a reference fake ID is generated. The falsification methods may include modifying text information of a real ID photo, modifying color of a real ID photo, modifying border of a real ID photo, modifying background of a real ID photo, modifying face of a real ID photo, or the like, or any combination thereof.

In step 930, a plurality of fake ID photos may be obtained based on different falsification method. For each category, one or more fake ID photos may be obtained by modifying the template of the category. It should be noted that modifying the template may include one or more falsification methods described above. For example, a fake ID photo may be obtained by modifying the texture information, or the color, or the border, or the background, or the face, or the like, or any combination thereof, of the template. After obtaining the fake ID photos, the photos may be classified into sub-categories in the category based on the falsification method of the photo.

In step 940, different convolutional neural network models may be trained using different training dataset. All the reference fake ID photos and the fake ID photos in a category may form a training dataset. Each training dataset may train a CNN model. The CNN model may be a Lenet, an Alexnet, a GoogleNet, a VGG, a ResNet, or the like, or any combination thereof. The training process of CNN models are in connection with FIG. 7, and are not repeated here.

In step 950, the trained CNN models may be obtained by one or more computers to determine fake ID feature of the target ID photo encoded in an electrical signal obtained by the computers and save the fake ID feature into the target feature vector or the reference feature vector.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 900. As another example, all the steps may be implemented in a computer-readable medium including a set of instructions. The instructions may be transmitted in the form of electronic current.

Figure 10:
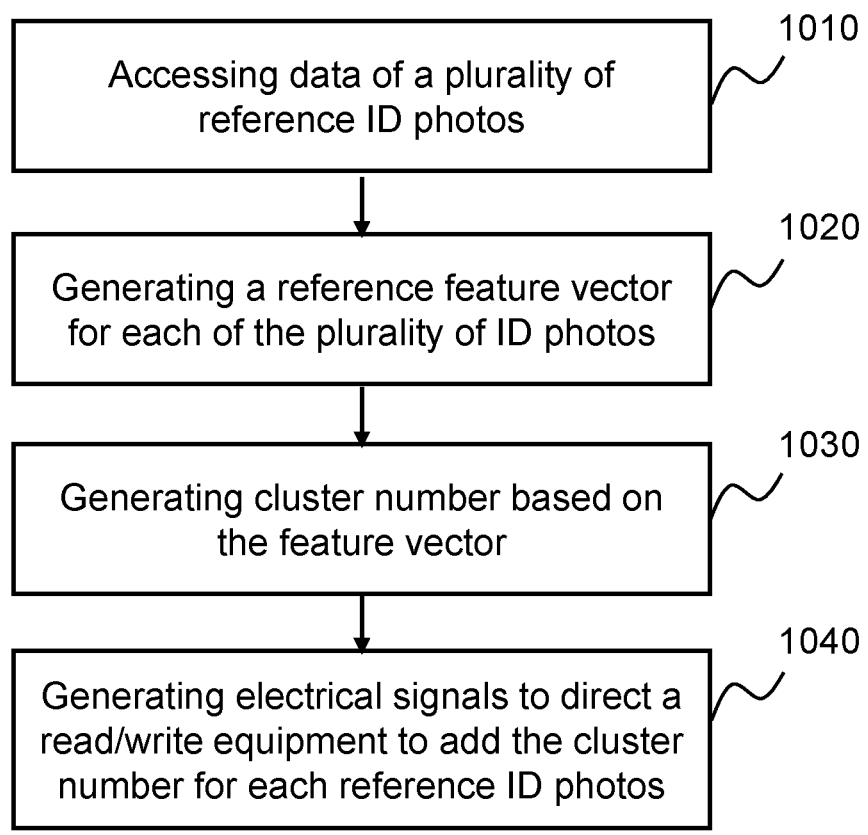
FIG. 10 is a flowchart of an exemplary process and/or method for establishing a database of reference ID photos according to some embodiments of the present disclosure.

FIG. 10 is a flowchart of an exemplary process and/or method 1000 for establishing a database of reference ID photos according to some embodiments of the present disclosure. In some embodiments, the process 1000 may be implemented in the system 100 illustrated in FIG. 1. For example, the process 1000 may be stored in the database 140 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In step 1010, the processor 220 may access data of a plurality of reference ID photos. In some embodiments, the data may be stored in a storage medium (memory) or any other devices with storing function. The computer may access the data via the data bus. The reference ID photo may include reference fake ID photo and fake ID photo In step 1020, the processor 220 may generate the reference feature vector for each reference ID photo. The features may include color distribution feature, texture feature, face feature and fake ID feature. The determination of the features of each reference ID photo are in connection with FIGS. 5-9, and are not repeated here. The processor 220 may perform the locality sensitive hashing (LSH) algorithm to generate a LSH vector based on the feature vector. The detail of Hash function {h: $R^d \to Z$} is as follows:

$$h_i(v) = \left\lfloor \frac{a_i \times x + b}{w} \right\rfloor. \quad (6)$$

where x is an original d-dimensional vector; w is a positive integer representing the hash bucket width; b is a random number satisfy uniformly distributed in internal [0, w]; each element of a may meets p-stable distribution. However, distinguishing ability of only one Hash function is not strong enough, a secondary Hash function may be constructed as follows:

$$g_j(x) = \{h_{j,1}(x) \ldots h_{j,k}(x)\} \ (j=1,\ldots,l). \quad (7)$$

Each LSH function $g_j(x)$ may be consisted of k Hash functions $h_j(x)$. After processed by a LSH function $g_j(x)$, each feature may generate a LSH vector. The LSH vector may be a k dimensional Hash vector and may have a Hash value. The k may be designated to as the Hash value of the LSH vector. Meanwhile, I (I≥1) Hash tables may be generated after the features processed by I LSH functions $g_j(x)$. Corresponding to each Hash table, the feature may obtain a Hash value. Each Hash table may have m Hash bucket. The feature may be assigned to one of the bucket of each Hash table based on the Hash values obtained after the feature processed by LSH algorithm. The features have the same Hash value may be assigned to the same bucket in each Hash table.

In step 1030, the processor 220 may generate a cluster number for each reference ID photo based on the LSH vector. As described above, a Hash table may have m Hash buckets. All the buckets may be identified by progressive number (form 1 to m). For the feature vector assigned to one bucket, the number of the bucket may be designated to as the cluster number of the feature vector. The feature vector with the same cluster number may be considered as in the same cluster. Feature vectors of different reference ID photos with same cluster number may represent that these different reference ID photos are very similar to each other. The cluster may be obtained based on the cluster numbers. The cluster number may represent an identification mark and the location of the reference ID photo in the database 140.

In step 1040, the processor 220 may generate an electrical signal to direct a read/write equipment to encode the data of the reference ID photos and add the cluster number to the data of the reference ID photos.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 1000. As another example, all the steps may be implemented in a computer-readable medium including a set of instructions. The instructions may be transmitted in the form of electronic current.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one computer-readable storage medium including a set of instructions for verifying authenticity of a target ID photo; and
   processing circuits in communication with the computer-readable storage medium, wherein when executing the set of instructions, the processing circuits are directed to:
      receive signals including a target identification (ID) photo;
      access a database of one or more reference fake ID photos;
      determine a target feature vector based on one or more features of a predetermined area on the target ID photo;
      divide an ID photo into at least one block, the ID photo being a reference fake ID photo or the target ID photo;
      determine grey scale of one or more pixels in each block;
      determine pixel gradient of each block based on the grey scale of the one or more pixels;
      determine texture feature of the ID photo based on the pixel gradient of each block;
      store the texture feature of the at least one block to a feature vector in the storage medium, the feature vector being a reference feature vector or a target feature vector;
      determine a difference value between the predetermined area on the target ID photo and a predetermined area of the one or more reference fake ID photos in the database by comparing the target feature vector with the reference feature vector, wherein the database of the one or more reference fake ID photos includes one or more structured data,
      each of the one or more structured data encoding a reference feature vector associated with the predetermined area of a reference fake ID photo;
      upon determining that the difference value is less than a threshold value, generate a warning code to indicate that the target ID photo is a fake ID photo.

2. The system of claim 1, wherein the difference value is a Euclidean distance.

3. The system of claim 1, wherein the processing circuits are further directed to:
   obtain signals including grey scale of a predetermined area of pixels in an ID photo, the ID photo being a reference fake ID photo or the target ID photo;
   determine one or more binary values based on the pixel and the one or more neighbors of the pixel;
   determine texture information of the pixel based on the one or more binary values;
   determine texture feature of the ID photo based on the texture information of all the pixels of the ID photo; and
   store the texture feature of the at least one block to a feature vector in the storage medium, the feature vector being the reference feature vector or the target feature vector.

4. The system of claim 1, wherein the processing circuits are further directed to:
   determine face feature by a trained convolutional neural network, wherein the predetermined area of the target ID photo includes a portrait area.

5. The system of claim 1, wherein the processing circuits are further directed to:
   determine fake ID feature by a trained convolutional neural network,
   wherein a trained convolutional neural network is trained, by at least one computer, with a plurality of reference fake ID photos.

6. The system of claim 1, wherein the processing circuits are further directed to establish the database of reference fake ID photos, including:
   to access in the database via a data bus of an online platform to read data of the one or more reference fake ID photos;
   to generate signals including the reference feature vector for each of the one or more reference fake ID photos based on a reference feature of each of the one or more reference fake ID photos;
   to generate signals including a cluster number based on the reference feature vector;
   for each of the one or more reference fake ID photos, to direct a read/write equipment to add the cluster number encoding the corresponding ID photo.

7. A method for approving a request, comprising:
   receiving, by at least one computer, signals including a target identification (ID) photo;
   accessing, by the at least one computer, a database of one or more reference fake ID photos;
   determining a target feature vector based on one or more features of a predetermined area on the target ID photo;
   dividing, by the at least one computer, an ID photo into at least one block, the ID photo being a reference fake ID photo or the target ID photo;
   determining, by the at least one computer, grey scale of one or more pixels in each block;
   determining, by the at least one computer, pixel gradient of each block based on the grey scale of the one or more pixels;

determining, by the at least one computer, texture feature of the ID photo based on the pixel gradient of each block;

storing, by the at least one computer, the texture feature of the at least one block to a feature vector in a storage medium, the feature vector being a reference feature vector or a target feature vector;

determining, by the at least one computer, a difference value between the predetermined area on the target ID photo and a predetermined area of the one or more reference fake ID photos in the database by comparing the target feature vector with the reference feature vector, wherein the database of the one or more reference fake ID photos includes one or more structured data, each of the one or more structured data encoding a reference feature vector associated with the predetermined area of a reference fake ID photo;

upon determining that the difference value is less than a threshold value, generating, by the at least one computer, a warning code to indicate that the target ID photo is a fake ID photo.

8. The method of claim 7, wherein the difference value is a Euclidean distance.

9. The method of claim 7, further comprising:

obtaining, by the at least one computer, signals including grey scale of a predetermined area of pixels in an ID photo, the ID photo being a reference fake ID photo or the target ID photo;

determining, by the at least one computer, one or more binary values between the pixel and the one or more neighbors of the pixel;

determining, by the at least one computer, texture information of the pixel based on the one or more binary values;

determining, by the at least one computer, texture feature of the ID photo based on the texture information of all the pixels of the ID photo; and determining, by the at least one computer, texture feature of the ID photo based on the texture information of all the pixels of the ID photo; and storing, by the at least one computer, the texture feature of the at least one block to a feature vector in a storage medium, the feature vector being the reference feature vector or the target feature vector.

10. The method of claim 7, further comprising:

determining, by the at least one computer, face feature by a trained convolutional neural network, wherein the predetermined area of the target ID photo includes a portrait area.

11. The method of claim 7, further comprising:

determining, by the at least one computer, fake ID feature by a trained convolutional neural network, wherein a trained convolutional neural network is trained, by the at least one computer, with a plurality of reference fake ID photos.

12. The method of claim 7, further comprising establishing the database of reference fake ID photos, which including:

accessing, by the at least one computer, in the database via a data bus of an online platform to read data of the one or more reference fake ID photos;

determining, by the at least one computer, a category for each of the one or more reference fake ID photos;

generating, by the at least one computer, signals including the reference feature vector for each of the one or more reference fake ID photos based on a reference feature of each of the one or more reference fake ID photos;

generating, by the at least one computer, signals including a cluster number based on the reference feature vector;

for each of the one or more reference fake ID photos, directing, by the at least one computer, a read/write equipment to add the cluster number encoding the corresponding category of the ID photo.

13. A non-transitory computer readable medium, comprising at least one set of instructions for verifying authenticity of a target ID photo, wherein when executed by processing circuits of a computer server, the at least one set of instructions directs the processing circuits to perform acts of:

receiving signals including a target identification (ID) photo;

accessing a database of one or more reference fake ID photos;

determining a target feature vector based on one or more features of a predetermined area on the target ID photo;

dividing an ID photo into at least one block, the ID photo being a reference fake ID photo or the target ID photo;

determining grey scale of one or more pixels in each block;

determining pixel gradient of each block based on the grey scale of the one or more pixels;

determining texture feature of the ID photo based on the pixel gradient of each block;

storing the texture feature of the at least one block to a feature vector in the storage medium, the feature vector being a reference feature vector or a target feature vector;

determining a difference value between the predetermined area on the target ID photo and a predetermined area of the one or more reference fake ID photos in the database by comparing the target feature vector with the reference feature vector, wherein the database of the one or more reference fake ID photos includes one or more structured data, each of the one or more structured data encoding a reference feature vector associated with the predetermined area of a reference fake ID photo;

upon determining that the difference value is less than a threshold value, generating a warning code to indicate that the target ID photo is a fake ID photo.

14. The non-transitory computer readable medium of claim 13, the at least one set of instructions further directs the processing circuits to perform acts of:

determining fake ID feature by a trained convolutional neural network, wherein a trained convolutional neural network is trained, by at least one computer, with a plurality of reference fake ID photos.

* * * * *